United States Patent [19]

Asano et al.

[11] Patent Number: 4,861,681
[45] Date of Patent: Aug. 29, 1989

[54] BRAZED ALUMINUM ARTICLE

[75] Inventors: Masami Asano, Susono; Ken Toma, Mishima; Yo Takeuchi, Susono, all of Japan

[73] Assignee: Mitsubishi Aluminum Kabushiki Kaisha, Tokyo, Japan

[21] Appl. No.: 194,382

[22] Filed: May 16, 1988

[30] Foreign Application Priority Data

Jun. 12, 1987 [JP] Japan .................................. 62-145375

[51] Int. Cl.⁴ ............................................. B32B 15/20
[52] U.S. Cl. .................................. 428/654; 420/514; 420/540; 420/580
[58] Field of Search ............... 420/514, 515, 531, 540, 420/580, 587; 228/263.11, 263.17; 428/650, 654

[56] References Cited

U.S. PATENT DOCUMENTS

| | | | |
|---|---|---|---|
| 1,661,052 | 2/1928 | Schuldt | 428/654 |
| 2,196,034 | 4/1940 | Schulze | 420/514 |
| 3,341,680 | 9/1967 | Rjabov et al. | 228/263.17 |

FOREIGN PATENT DOCUMENTS

| | | | |
|---|---|---|---|
| 50-35018 | 11/1975 | Japan . | |
| 11148 | 1/1977 | Japan | 428/650 |
| 95114 | 8/1978 | Japan | 428/654 |
| 11771 | 1/1983 | Japan | 420/540 |
| 113153 | 6/1984 | Japan | 420/515 |
| 113154 | 6/1984 | Japan | 420/531 |
| 113155 | 6/1984 | Japan | 420/515 |
| 197550 | 11/1984 | Japan | 420/515 |
| 187657 | 9/1985 | Japan | 420/540 |

*Primary Examiner*—Robert McDowell
*Attorney, Agent, or Firm*—Frishauf, Holtz, Goodman & Woodward

[57] ABSTRACT

A brazed aluminum article comprising at least two aluminum members brazed together with a filler metal, which consists essentially of:
zinc: from 20 to 80 wt. %,
silicon: from 1 to 11 wt. %, and
the balance being aluminum and incidental impurities.

The above-mentioned filler metal may further additionally contain copper within the range of from 0.1 to 10 wt. %. The ratio of the silicon content to the aluminum content in the above-mentioned filler metal should preferably be within the range of from 0.05 to 0.12.

2 Claims, 1 Drawing Sheet

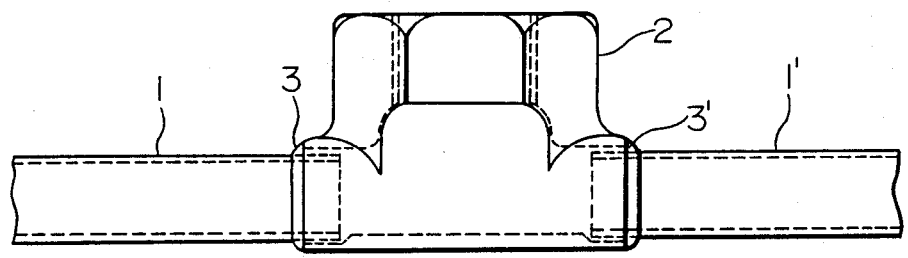

BRAZED ALUMINUM ARTICLE

REFERENCE TO PATENTS, APPLICATIONS AND PUBLICATIONS PERTINENT TO THE INVENTION

As far as we know, there is available the following prior art document pertinent to the present invention:

Japanese Patent Publication No.50-35,018 dated Nov. 13, 1975.

The contents of the prior art disclosed in the aforementioned prior art document will be discussed hereafter under the heading of the "BACKGROUND OF THE INVENTION".

FIELD OF THE INVENTION

The present invention relates to a filler metal for brazing aluminum members or aluminum alloy members (hereinafter generically referred to as "aluminum members").

BACKGROUND OF THE INVENTION

Aluminum members are increasingly used as components of a vehicle such as an automobile or a motorcycle to reduce the weight of the vehicle. Aluminum members are widely used particularly in a heat exchanger incorporated in a vehicle. Connection of aluminum members, for example, an aluminum tube and an aluminum connector or union is usually carried out by a braking method as described below: Aluminum members to be joined are tacked by means of an appropriate jig. Then, the joint of the thus tacked aluminum members is covered with flux as required. A lumpy, wire-shaped, bar-shaped, strip-shaped, or powdery filler metal, or a filler metal previously formed into the shape matching with that of the joint is added to the joint, and the joint is heated with a torch to melt the filler metal. The joint is thus brazed by the melted filler metal. Methods are also available which comprise conducting brazing by heating the aluminum members added with the filler metal and flux on the joint in a furnace, and which comprise applying shock by ultrasonic wave to the joint and carrying out brazing while removing an oxide film formed on the surfaces of the filler metal and the aluminum members by this shock.

As the above-mentioned filler metal for brazing the aluminum members, there is conventionally employed an Al-Si-base filler metal containing from 9 to 13 wt. % Si as denominated BA4343, BA4045 or BA4047 in the JIS (Japanese Industrial Standards). The Al-Si-base filler metal has a solidus temperature of 577° C. and a liquidus temperature of from 577° to 620° C. The brazing temperature range of Al-Si-Base filler metal, i.e., the temperature range within which an appropriate fluidity for brazing is produced in the filler metal is close to the solidus temperature of the aluminum members to be joined. As a result, the portion near the joint of the aluminum members is melted or deformed unless the brazing temperature is strictly controlled.

On the other hand, the above-mentioned connection of aluminum members may be accomplished also by a soldering method which comprises: using a Zn-base solder comprising 100 wt. % Zn or comprising 95 wt. % Zn and 5 wt. % Al, and soldering a joint of aluminum members by means of the solder in accordance with the same method as in the brazing method described above. The Zn-base solder has a soldering temperature range far lower than the solidus temperature of the aluminum members. The problems as posed in the above-mentioned Al-Si-base filler metal are non-existent in the solder. However, the Zn-base solder has the following problem: A tough oxide film is formed on the surface of the Zn-base solder. When carrying out soldering, therefore, it is necessary to destroy the oxide film produced on the solder surface by strongly rubbing the joint of the aluminum members with the solder, thus resulting in many troubles in the soldering operation. Insufficient destruction of the oxide film prevents formation of a satisfactory fillet on the joint and causes deterioration of the quality of the joint.

With a view to solving the above-mentioned problems, the following filler metal suitable for brazing aluminum members is proposed:

A filler metal for brazing aluminum members, as disclosed in Japanese Patent Publication No.50-35,018 dated Nov. 13, 1975, which consists essentially of:
zinc: from 4 to 10 wt. %,
silicon: from 3 to 6 wt. %, and
the balance being aluminum and incidental impurities (hereinafter referred to as the "prior art").

The above-mentioned prior art has the following problem: Since the zinc content is as low as within the range of from 4 to 10 wt. %, this filler metal has a brazing temperature range close to the solidus temperature of the aluminum members. It is therefore necessary to conduct brazing at a high temperature near the solidus temperature of the aluminum members, thus resulting in melting or deformation of the portion near the joint of the aluminum members.

Under such circumstances, there is a strong demand for development of a filler metal for brazing aluminum members, which permits brazing of aluminum members at a temperature lower than the solidus temperature of the aluminum members, gives a satisfactory fluidity of the melted filler metal, allows, during brazing, easy destruction of an oxide film formed on the surface of the filler metal, and thus leads to a joint excellent in quality, but a filler metal having such properties has not as yet been proposed.

SUMMARY OF THE INVENTION

An object of the present invention is a brazed aluminum member utilizing a specified filler metal which permits brazing of aluminum members at a temperature lower than the solidus temperature of the aluminum members, gives a satisfactory fluidity of the melted filler metal, allows, during brazing, easy destruction of an oxide film formed on the surface of the filler metal, and thus leads to a joint excellent in quality.

In accordance with one of the features of the present invention, there is provided a filler metal for brazing aluminum members, which consists essentially of:
zinc: from 20 to 80 wt. %,
silicon: from 1 to 11 wt. %, and
the balance being aluminum and incidental impurities.

The filler metal of the present invention may further additionally contain copper within the range of from 0.1 to 10 wt. %. The ratio of the silicon content to the aluminum content in the filler metal of the present invention should preferably be within the range of from 0.05 to 0.12.

BRIEF DESCRIPTION OF THE DRAWING

The accompanying drawing is a front view illustrating aluminum members for a brazing test.

DETAILED DESCRIPTION OF PREFERRED EMBODIMENTS

From the above-mentioned point of view, extensive studies were carried out with a view to developing a filler metal for brazing aluminum members, which permits brazing of aluminum members at a temperature lower than the solidus temperature of the aluminum members, gives a satisfactory fluidity of the melted filler metal, allows, during brazing, easy destruction of an oxide film formed on the surface of the filler metal, and thus leads to a joint excellent in quality. As a result, the following findings were obtained: By limiting the zinc content within the range of from 20 to 80 wt. %, and further limiting the silicon content within the range of from 1 to 11 wt. %, it is possible to braze aluminum members at a temperature lower than the solidus temperature of the aluminum members, i.e., within the range of from 450° to 570° C., to improve fluidity of the melted filler metal, to easily destruct, during brazing, an oxide film produced on the surface of the filler metal, and thus to obtain a joint excellent in quality.

The present invention was made on the basis of the above-mentioned findings, and the filler metal for brazing aluminum members of the present invention consists essentially of:
zinc from 20 to 80 wt. %,
silicon from 1 to 11 wt. %, and
the balance being aluminum and incidental impurities.

The filler metal of the present invention may further additionally contain copper within the range of from 0.1 to 10 wt. %. The ratio of the silicon content to the aluminum content in the filler metal of the present invention should preferably be within the range of from 0.05 to 0.12.

Now, the reasons why the chemical composition of the filler metal for brazing aluminum members of the present invention is limited within the above-mentioned ranges are described below:

(1) Zinc:

Zinc has the effect of reducing the liquidus temperature and the solidus temperature of the filler metal. However, with a zinc content of under 20 wt. %, a desired effect as described above cannot be obtained. With a zinc content of over 80 wt. %, on the other hand, workability of the filler metal deteriorates and a tough oxide film is produced on the surface of the filler metal. As a result, a satisfactory fillet cannot be formed on the joint, resulting in a lower quality of the joint. In addition, melted filler metal increasingly tends to erode the aluminum members. The zinc content should therefore be within the range of from 20 to 80 wt. %, and should preferably be within the range of from 30 to 60 wt. %.

(2) Silicon:

Silicon has the effect of producing Al-Si eutectic crystal grains, and improving fluidity of the melted filler metal by means of the thus produced Al-Si eutectic grains. Improvement of fluidity of the melted filler metal, in cooperation with the effect of zinc as mentioned above, makes it possible to conduct brazing of aluminum members at a temperature within the range of from 450 to 570° C., which is lower than the solidus temperature of the aluminum members. Furthermore, the presence of silicon accelerates destruction by flux of an oxide film produced on the surface of the filler metal. However, with a silicon content of under 1 wt. %, a desired effect as described above cannot be obtained. With a silicon content of over 11 wt. %, on the other hand, fluidity of the melted filler metal becomes lower, thus making it impossible to form a satisfactory fillet on the joint and deteriorating workability of the filler metal. The silicon content should therefore be within the range of from 1 to 11 wt. %, and should preferably be within the range of from 2 to 6 wt. %.

(3) Copper:

Copper has the effect of reducing the liquidus temperature of the filler metal, and increasing strength of the joint. In the present invention, therefore, copper is further additionally contained, if necessary. However, with a copper content of under 0.1 wt. %, a desired effect as described above cannot be obtained. A copper content of over 10 wt. %, on the other hand, degrades fluidity of the melted filler metal. The copper content should therefore be within the range of from 0.1 to 10 wt. %.

(4) Ratio of silicon content to aluminum content:

The ratio of the silicon content to the aluminum content, i.e., Si/Al, affects the production of Al-Si eutectic crystal grains. In the filler metal for brazing of the present invention, therefore, the ratio of the silicon content to the aluminum content should preferably be within the range of from 0.05 to 0.12. With an Si/Al ratio of under 0.05, production of Al-Si eutectic crystal grains is insufficient, so that fluidity of the melted filler metal cannot be sufficiently improved. With an Si/Al ratio of over 0.12, on the other hand, excessive production of primary crystal grains of Si degrades fluidity of the melted filler metal.

A filler metal for brazing is usually used after working same into a fine wire-shape. Now, the process for working the filler metal of the present invention into a fine wire-shape is described. An ingot of the filler metal for brazing having the chemical composition within the scope of the present invention is prepared by a conventional melting and casting method. The thus cast ingot is heated to a prescribed temperature, and then, subjected to a hot extrusion with a prescribed extrusion ratio at a prescribed extrusion speed to obtain a wire rod. The thus obtained wire rod is then subjected to a hot wire drawing at a prescribed temperature, whereby a fine wire-shaped filler metal having a prescribed diameter is manufactured. A fine wire-shaped filler metal may be manufactured only through the hot extrusion as described above, depending upon the diameter thereof.

Desirable working conditions in the above-mentioned process are as follows:

(1) Heating temperature of ingot:

When applying the hot extrusion, the heating temperature of the ingot should preferably be within the range of from 150° to 350° C. With a heating temperature of the ingot of under 150° C., hot extrudability is poor, requiring a very large pressing force for hot extrusion. With a heating temperature of the ingot of over 350° C., on the other hand, the temperature of the hot-extruded wire rod becomes excessively high, because of the heat generated during hot extrusion. As a result, many cracks are produced in the wire rod, leading, in an extreme case, to the molten state of the wire rod.

(2) Hot extrusion ratio:

The ratio of the cross-sectional area of the ingot before hot extrusion to the cross-sectional area of the hot-extruded wire rod (if a plurality of wire rods are simultaneously hot-extruded, the total of the cross-sectional areas thereof), i.e., the hot extrusion ratio, should preferably be up to 60. With a hot extrusion ratio of over 60, the hot extrusion requires a very large pressing force, resulting in many cracks produced in the hot-extruded wire rod.

(3) Hot extrusion speed:

The travelling speed of a hot-extruded wire rod, i.e., the hot extrusion speed should preferably be within the range of from 0.1 to 15 m/minute. A hot extrusion speed of under 0.1 m/minute leads to a very low productivity, and is not therefore suitable for actual operation. With a hot extrusion speed of over 15 m/minute, on the other hand, the hot extrusion requires a very large pressing force and many cracks are produced in the hot-extruded wire rod.

(4) Wire drawing temperature:

The wire drawing temperature of the wire rod should preferably be within the range of from 100° to 300° C. A wire drawing temperature of under 100° C. makes it difficult to accomplish the wire drawing. With a wire drawing temperature of over 300° C., on the other hand, the drawn fine wire is in a molten state or a quasi-molten state, making it difficult for the fine wire to keep the prescribed shape.

Now, the filler metal for brazing aluminum members of the present invention is described more in detail with reference to examples while comparing same with filler metals outside the scope of the present invention.

EXAMPLES

As shown in Table 1, samples of the filler metal for brazing of the present invention (hereinafter referred to as the "samples of the invention") Nos. 1 to 10 having chemical compositions within the scope of the present invention and samples for comparison of filler metals (hereinafter referred to as the "samples for comparison") Nos. 1 to 6 having chemical compositions, at least one element of which is outside the scope of the present invention, were prepared by the method as described below.

Cylindrical ingots, each having dimensions of 30 mm in diameter and 200 mm in length and having a chemical composition as shown in Table 1, for preparing the samples of the invention Nos. 1 to 10, and cylindrical ingots, each having the same dimensions as mentioned above and having a chemical composition as shown in Table 1, for preparing the samples for comparison Nos. 1 to 6, were cast by a conventional melting and casting method. Each of the thus cast ingots was heated to a temperature shown in Table 1, and then, subjected to a hot extrusion with an extrusion ratio at an extrusion speed shown in Table 1 to obtain a wire rod. Each of the thus obtained wire rods was then subjected to a warm wire drawing at a temperature within the range of from 100° to 300° C. The samples of the invention Nos. 1 to 10 and the samples for comparison Nos. 1 to 6 each having a fine wire-shape of a diameter of 1.6 mm were thus prepared. The liquidus temperature of each samples is also shown in Table 1.

The state in which brazing was conducted with the use of each of the samples of the invention Nos. 1 to 10 and the samples for comparison Nos. 1 to 6 was investigated by the following method: As shown in the accompanying drawing, two tubes 1 and 1' having a diameter of 8 mm and comprising Al-Mn-base aluminum alloy as denominated A3003 in the JIS were respectively fitted to the both ends of a connector 2 comprising Al-Zn-Mg-base aluminum alloy as denominated A7N01 in the JIS, and the assembly was tacked by means of a jig (not shown). A plurality of aluminum members for brazing test (hereinafter referred to as the "aluminum members for test") were thus prepared. Then, flux was applied to joints 3 and 3' of each of the aluminum members for test between the two tubes 1 and 1' and the connector 2. Subsequently, the joints 3 and 3' of the aluminum members for test were brazed with the use of each of the samples of the invention Nos. 1 to 10 and the samples for comparison Nos. 1 to 6 while heating the joints 3 and 3' with a torch. Then, the range of brazing temperatures, fluidity of each sample, formation of a fillet on the joint, and the production of melting near the joint of the aluminum members for test were investigated for each of the samples of the invention Nos. 1 to 10 and the samples for comparison Nos. 1 to 6 which were used to braze the aluminum members for test. Table 2 shows the results of this investigation, together with the chemical compositions of the fluxes used.

TABLE 1

| | Chemical composition | | | | | | Liquidus temperature (°C.) | Hot extrusion conditions | | |
| --- | --- | --- | --- | --- | --- | --- | --- | --- | --- | --- |
| No. | Zn (wt. %) | Si (wt. %) | Cu (wt. %) | Al (wt. %) | Incidental impurities (wt. %) | Si/Al | | Heating temp. of ingot (°C.) | extrusion ratio | extrusion speed (m/minute) |
| Samples of the invention | | | | | | | | | | |
| 1 | 22 | 10 | — | 67 | 1 | 0.15 | 560 | 350 | 50 | 2.0 |
| 2 | 22 | 8 | — | 69 | 1 | 0.12 | 555 | 350 | 50 | 2.0 |
| 3 | 24 | 7 | — | 68 | 1 | 0.10 | 550 | 350 | 50 | 5.0 |
| 4 | 36 | 6 | — | 57 | 1 | 0.11 | 520 | 350 | 50 | 1.0 |
| 5 | 44 | 6 | — | 49 | 1 | 0.12 | 500 | 300 | 40 | 1.0 |
| 6 | 59 | 3 | — | 37 | 1 | 0.08 | 460 | 300 | 40 | 1.0 |
| 7 | 75 | 2 | — | 22 | 1 | 0.09 | 450 | 200 | 30 | 0.5 |
| 8 | 44 | 6 | 0.2 | 48.8 | 1 | 0.12 | 500 | 300 | 40 | 1.0 |
| 9 | 45 | 6 | 1 | 47 | 1 | 0.13 | 490 | 300 | 40 | 1.0 |
| 10 | 40 | 5 | 9 | 45 | 1 | 0.11 | 460 | 300 | 40 | 1.0 |
| Samples for comparison | | | | | | | | | | |
| 1 | — | 11 | — | 88 | 1 | 0.13 | 577 | 450 | 40 | 5.0 |
| 2 | 94 | — | — | 5 | 1 | — | 385 | 150 | 30 | 0.1 |
| 3 | 10 | 5 | — | 84 | 1 | 0.06 | 570 | 450 | 40 | 5.0 |
| 4 | 88 | 6 | — | 5 | 1 | 1.2 | 410 | 200 | 30 | 0.1 |
| 5 | 57 | 0.6 | — | 41.4 | 1 | 0.01 | 530 | 300 | 40 | 1.0 |
| 6 | 60 | 15 | — | 24 | 1 | 0.62 | 510 | 300 | 30 | 0.1 |

TABLE 2

| No. | Brazing temperature range (°C.) | Chemical composition of flux (wt. %) | Fluidity | Formation of fillet | Production of melting near joint |
|---|---|---|---|---|---|
| Samples of the invention | | | | | |
| 1 | 550-570 | NaCl:30, KCl:40, LiCl:10, LiF:10, ZnCl$_2$:10 | Fair | Good | None |
| 2 | 545-570 | " | Good | Good | None |
| 3 | 540-570 | " | Good | Good | None |
| 4 | 510-550 | " | Good | Good | None |
| 5 | 490-530 | NaF:5, ZnCl$_2$:20, LiCl:40, KCl:35 | Good | Good | None |
| 6 | 450-500 | " | Good | Good | None |
| 7 | 450-485 | " | Good | Good | None |
| 8 | 490-530 | " | Good | Good | None |
| 9 | 480-520 | " | Fair | Good | None |
| 10 | 460-490 | " | Good | Good | None |
| Samples for comparison | | | | | |
| 1 | 585-600 | NaF:5, ZnCl$_2$:10, LiCl:38, KCl:47 | Good | Good | Partially produced |
| 2 | 400-440 | NaF:6, ZnCl$_2$:24, LiCl:42, KCl:28 | Good | Poor | None |
| 3 | 570-600 | NaCl:30, KCl:40, LiCl:10, LiF:10, ZnCl$_2$:10 | Poor | Good | Partially produced |
| 4 | 405-460 | NaF:5, ZnCl$_2$:20, LiCl:40, KCl:35 | Good | Poor | None |
| 5 | 520-570 | " | Fair | Poor | None |
| 6 | 510-580 | " | Fair | Fair | None |

As is clear from Tables 1 and 2, brazing with the sample for comparison No. 1 not containing zinc required a high brazing temperature because the sample had a high brazing temperature range, resulting in a partial melting of the aluminum members for test near the joint. Brazing with the sample for comparison No. 2 not containing silicon and having a high zinc content outside the scope of the present invention led to an insufficient formation of a fillet on the joint of the aluminum members for test under the effect of a tough oxide film produced on the sample surface, with furthermore a poor workability of the sample, although not shown in Table 2. Brazing with the sample for comparison No. 3 having a low zinc content outside the scope of the present invention resulted in a poor fluidity of the melted sample. In addition, the high brazing temperature range of the sample required brazing at a high temperature, resulting in a partial melting of the aluminum members for test near the joint. Brazing with the sample for comparison No. 4 having a high zinc content outside the scope of the present invention led to an insufficient formation of a fillet on the joint under the effect of a tough oxide film produced on the sample surface, with furthermore a poor workability of the sample, although not shown in Table 2. Brazing with the sample for comparison No. 5 having a low silicon content outside the scope of the present invention resulted in a fair fluidity of the melted sample. In addition, insufficient destruction of the oxide film produced on the sample surface led to an insufficient formation of a fillet on the joint. Brazing with the sample for comparison No. 6 having a high silicon content outside the scope of the present invention resulted in a fair fluidity of the melted sample, with an insufficient formation of a fillet on the joint. Workability of the sample was also poor, although not shown in Table 2.

In brazing with each of the samples of the invention Nos. 1 to 10, in contrast, the brazing temperature range of the sample was lower than the solidus temperature of the aluminum members for test in all cases, so that brazing could be conducted at a temperature lower than the solidus temperature of the aluminum members for test. As a result, melting or deformation was never produced near the joint of the aluminum members for test. Although each melted sample showed a fair fluidity in the samples of the invention Nos. 1 and 9 having a high Si/Al ratio outside the preferable scope of the present invention, each melted sample exhibited a satisfactory fluidity in the samples of the invention Nos. 2 to 8 and 10 having an Si/Al ratio within the preferable scope of the present invention. Furthermore, in the samples of the invention Nos. 1 to 10, formation of a fillet on the joint of the aluminum members for test and workability of the sample were satisfactory in all cases, resulting in a high quality joints.

According to the filler metal for brazing of the present invention, as described above in detail, the following industrially useful effects are provided:

(1) The brazing temperature range of the filler metal is lower than the solidus temperature of the aluminum members, and the melted filler metal shows a good fluidity. It is therefore possible to conduct brazing of the aluminum members at a temperature lower than the solidus temperature of the aluminum members, so that melting or deformation is never produced near the joint of the aluminum members.

(2) The oxide film produced on the surface of the filler metal is easily destroyed by flux during brazing. It is not therefore necessary to take a measure for destroying the oxide film, by strongly rubbing the joint of the aluminum members with the filler metal, for example, when conducting brazing.

(3) Satisfactory formation of a fillet on the joint of the aluminum members is available, and therefore a high-quality joint can be obtained.

(4) It is possible to easily form the filler metal into any shape such as a wire-shape, a bar-shape or a strip-shape.

What is claimed is:

1. A brazed aluminum article comprising at least two aluminum members brazed together with a filler metal, which consists essentially of:
   zinc: from 30 to 50 wt. %,
   silicon: from 2 to 6 wt. %, and
   the balance being aluminum and incidental impurities, the ratio of the content of said silicon to the content of said aluminum in said filler metal being within the range of from 0.05 to 0.12.

2. The brazed aluminum article as claimed in claim 1, wherein:
   said filler metal further additionally contains copper within the range of from 0.1 to 10 wt. %.

* * * * *